United States Patent
Bell et al.

(10) Patent No.: US 8,492,501 B2
(45) Date of Patent: Jul. 23, 2013

(54) POLYCARBONATE RECOVERY FROM POLYMER BLENDS BY LIQUID CHROMATOGRAPHY

(75) Inventors: Philip Bell, Mount Vernon, IN (US); David Zoller, Evansville, IN (US)

(73) Assignee: Sabic Innovative Plastics IP B.V., Bergen op Zoom (NL)

( * ) Notice: Subject to any disclaimer, the term of this patent is extended or adjusted under 35 U.S.C. 154(b) by 0 days.

(21) Appl. No.: 13/463,568

(22) Filed: May 3, 2012

(65) Prior Publication Data

US 2012/0329977 A1 Dec. 27, 2012

Related U.S. Application Data (60) Provisional application No. 61/487,187, filed on May 17, 2011.

(51) Int. Cl.
*C08G 63/02* (2006.01)
*C08G 64/00* (2006.01)

(52) U.S. Cl.
USPC .......................................... 528/196; 528/198

(58) Field of Classification Search
USPC ................................ 210/198.2; 528/196, 198
See application file for complete search history.

(56) References Cited

U.S. PATENT DOCUMENTS

| | | | |
|---|---|---|---|
| 4,157,434 A | 6/1979 | Floryan et al. | |
| 4,482,705 A | 11/1984 | Hambrecht et al. | |
| 6,976,383 B2 * | 12/2005 | Petro et al. | 73/61.55 |
| 2009/0211967 A1 | 8/2009 | Delsman et al. | |

FOREIGN PATENT DOCUMENTS

KR 10-1996-0004115 B1 3/1996

OTHER PUBLICATIONS

International Search Report and Written Opinion; International Appliction No. PCT/US2012/069385; International Filing Date Dec. 13, 2012; Date of Mailing Mar. 26, 2013; Agent's File Reference P020429PCT; 6 pages.

* cited by examiner

*Primary Examiner* — Terressa Boykin
(74) *Attorney, Agent, or Firm* — Diderico van Eyl; Novak Druce Connolly Bove + Quigg LLP (57) ABSTRACT

Polycarbonates are recovered from polymer blends by liquid chromatography. Polycarbonate recovered by the process can be reused in new applications. The invention can be extended to recycling of other polymers present in the blends.

15 Claims, 3 Drawing Sheets

POLYCARBONATE RECOVERY FROM POLYMER BLENDS BY LIQUID CHROMATOGRAPHY

CROSS-REFERENCE TO RELATED APPLICATIONS

This application claims benefit of U.S. Provisional Patent Application Ser. No. 61/487,187, filed May 17, 2011, the entire disclosure of which is herein incorporated by reference.

DESCRIPTION OF INVENTION

1. Field of the Invention

The current invention establishes a method to recover substantially pure polycarbonate from mixed plastic streams. To simulate polycarbonate-containing postconsumer streams, various mixtures of polycarbonate blends have been made and then separated using gradient polymer elution chromatography. Evaluations of the eluted materials showed effective separation of the polycarbonate from the other components in the blends. Supporting data is attached below. Polycarbonate recovered by this process can then be reused in a new application. This invention can be extended to recycling of other polymers present in blends

2. Description of the Related Art

Polycarbonate (also referred to as "PC") is an amorphous polymer that has been used in many applications, such as CD disks, eyewear lenses, electronic components, construction materials, DVDs, Blu-Ray Discs, signs, displays, windows, drinking and food containers, small electronics housings, computer housings, riot shields, visors, instrument panels, blender jars, toys, and medical applications.

Unfortunately, despite recycling efforts, billions of pounds of polycarbonate are still dumped into landfills annually all over the world. Other polycarbonate that is not reused is incinerated. The polycarbonate that is disposed into landfills creates significant waste. The incineration of polycarbonate also wastes a significant resource that could be used more effectively.

Some polycarbonate products sold contain recycled material which comes from internal recycle of rework and flush. These materials are either blended in with virgin PC, or with additives. Suppliers of PC products currently produce post-consumer recycle polycarbonate grades by blending post-consumer polycarbonate with virgin polycarbonate. The disadvantages of using traditional post-consumer recycle streams, water bottle regrinds and ground compact discs, are high cost and inferior polymer properties.

For the foregoing reasons, it would be highly advantageous to have a low-cost source of post-consumer polycarbonate with good properties. For the foregoing reasons, it would be highly advantageous to have a low-cost process for extracting polycarbonate from used articles.

SUMMARY OF THE INVENTION

In one embodiment, the present invention is directed to a method of recovering polycarbonate (PC) from a feed composition of other recycled components. Preferably, the recycle mixture, includes a polycarbonate and can include other materials that are used with polycarbonates, e.g. one or more of such wide varying components as mold release agent(s), UV stabilizer(s), glass, anti-drip agents, impact modifier(s), anti-oxidant(s), flame retardant (FR) synergist(s), heat stabilizer(s), quencher(s), phosphate stabilizer(s), pigment(s), dye(s), titanium dioxide, carbon black, talc, bulk ABS (acrylonitrile butadiene styrene), emulsions of ABS and styrene acrylonitrile polymers. The recovered PC may be in the form of PC homopolymers and/or PC copolymers and is separated from the feed composition by liquid chromatography.

In another embodiment, the invention is directed to recycling PC from waste compositions and using the recovered PC as a feedstock to make new PC products.

More particularly, in one embodiment, the invention relates to a method comprising separating at least one polycarbonate polymer by liquid chromatography from a feed composition comprising a polycarbonate component selected from the group of polycarbonate homopolymers and polycarbonate copolymers and at least one member selected from the group of a mold release agent, a UV stabilizer, a glass, an anti-drip agent, an impact modifier, an anti-oxidant, an FR synergist, a heat stabilizer, a quencher, a phosphate stabilizer, a pigment, a dye, titanium dioxide, carbon black, talc, a bulk acrylonitrile butadiene styrene, an acrylonitrile butadiene styrene emulsion, a styrene acrylonitrile polymer, and combinations thereof.

DETAILED DESCRIPTION OF THE PREFERRED EMBODIMENTS

The invention will be more readily understood with regard to the following detailed description when read in conjunction with the following Examples and appended drawings.

A feed composition comprising homopolymer or copolymer of polycarbonate (PC) and at least one member selected from mold release agent(s), UV stabilizer(s), glass, anti-drip agents, impact modifier(s), anti-oxidant(s), flame retardant (FR) synergist(s), heat stabilizer(s), quencher(s), phosphate stabilizer(s), pigment(s), dye(s), titanium dioxide, carbon black, talc, bulk ABS (acrylonitrile butadiene styrene), emulsions of ABS and styrene acrylonitrile polymer are conveyed through one or more columns packed, and into contact with, any chromatography resin, synthetic based resins, e.g. styrene-DVB, organic polymer-based resins, such as agarose or dextran, or inorganic resins, such as silica. To the resins conventional ligands are advantageously coupled, such as affinity ligands, ion exchange ligands, hydrophobic interaction chromatography (HIC) ligands, chelating ligands, thiophilic ligands or multimodal ligands to separate the desired PC component(s) from the feed composition.

Prior to conveying the feed composition through the packed columns, a solvent is added to solubilize the PC component(s) and the resulting solution/suspension can optionally be filtered to remove insoluble components.

The invention can be used in stationary bed chromatography, but is not limited to stationary bed and can also be used in simulated moving bed chromatography.

More particularly, the invention relates to a method comprising: separating at least one polycarbonate polymer by liquid chromatography from a feed composition comprising a polycarbonate component selected from the group of polycarbonate homopolymers and polycarbonate copolymers and at least one member selected from the group of a mold release agent, a UV stabilizer, a glass, an anti-drip agent, an impact modifier, an anti-oxidant, an FR synergist, a heat stabilizer, a quencher, a phosphate stabilizer, a pigment, a dye, titanium dioxide, carbon black, talc, a bulk acrylonitrile butadiene styrene, an acrylonitrile butadiene styrene emulsion, a styrene acrylonitrile polymer, and combinations thereof.

The liquid chromatography is simulated moving bed chromatography, such that the feed composition forms a raffinate stream substantially containing non-polycarbonate materials and an extract stream substantially containing the polycarbonate. In one embodiment, the liquid chromatography is gradient polymer elution chromatography.

The packing material can be any packing material, which when used in accordance to the inventions, enables the extraction of polycarbonate with chromatography. Examples of suitable packing materials include organic polymer-based resins, such as agarose or dextran, inorganic resins, such as silica, or synthetic based resins, e.g. styrene-DVB can be used. To the resins conventional ligands are advantageously coupled, such as affinity ligands, ion exchange ligands, hydrophobic interaction chromatography (HIC) ligands, chelating ligands, thiophilic ligands or multimodal ligands. In another embodiment, the method is practiced with a packing selected from the group consisting of polymer-based particles, uncoated inorganic particles and ligand modified particles of polymer or inorganic particles is employed to separate at least one polycarbonate polymer by liquid chromatography. The inorganic particles can be silica. The packing material can also be styrene-DVB.

The polycarbonate can be a polycarbonate homopolymer or a polycarbonate co-polymer. Polycarbonates are polymers having repeating structural carbonate units (1)

(1)

in which at least 60 percent of the total number of $R^1$ groups contain aromatic moieties and the balance thereof are aliphatic, alicyclic, or aromatic. In an embodiment, each $R^1$ is a $C_{6-30}$ aromatic group, that is, contains at least one aromatic moiety. $R^1$ can be derived from an aromatic dihydroxy compound of the formula HO—$R^1$—OH, in particular (2)

(2)

wherein each of $A^1$ and $A^2$ is a monocyclic divalent aromatic group and Y is a single bond or a bridging group having one or more atoms that separate $A^1$ from $A^2$. In an exemplary embodiment, one atom separates $A^1$ from $A^2$. Also included are bisphenol compounds (3)

(3)

wherein $R^a$ and $R^b$ are each independently a halogen atom or a monovalent hydrocarbon group and may be the same or different; p and q are each independently integers of 0 to 4; and $X^a$ is a bridging group connecting the two hydroxy-substituted aromatic groups, where the bridging group and the hydroxy substituent of each $C_6$ arylene group are disposed ortho, meta, or para (specifically para) to each other on the $C_6$ arylene group. In an embodiment, the bridging group $X^a$ is a single bond, —O—, —S—, —S(O)—, —S(O)$_2$—, —C(O)—, or a $C_{1-18}$ organic group. The $C_{1-18}$ organic bridging group can be cyclic or acyclic, aromatic or non-aromatic, and can further comprise heteroatoms such as a halogen, oxygen, nitrogen, sulfur, silicon, or phosphorous. The $C_{1-18}$ organic group can be disposed such that the $C_6$ arylene groups connected thereto are each connected to a common alkylidene carbon or to different carbons of the $C_{1-18}$ organic bridging group. In particular, $X^a$ is a $C_{1-18}$ alkylene group, a $C_{3-18}$ cycloalkylene group, a fused $C_{6-18}$ cycloalkylene group, or a group of the formula —$B^1$—W—$B^2$— wherein $B^1$ and $B^2$ are the same or different $C_{1-6}$ alkylene group and W is a $C_{3-12}$ cycloalkylidene group or a $C_{6-16}$ arylene group. Exemplary $C_{1-18}$ organic bridging groups include methylene, cyclohexylmethylene, ethylidene, neopentylidene, and isopropylidene, as well as 2-[2,2,1]-bicycloheptylidene and cycloalkylidenes such as cyclohexylidene, cyclopentylidene, cyclododecylidene, and adamantylidene. A specific example of bisphenol (3) wherein $X^a$ is a substituted cycloalkylidene is the cyclohexylidene-bridged, alkyl-substituted bisphenol (4)

(4)

wherein $R^{a'}$ and $R^{b'}$ are each independently $C_{1-12}$ alkyl, $R^g$ is $C_{1-12}$ alkyl or halogen, r and s are each independently 1 to 4, and t is 0 to 10. In a specific embodiment, at least one of each of $R^{a'}$ and $R^{b'}$ is disposed meta to the cyclohexylidene bridging group. The substituents $R^{a'}$, $R^{b'}$, and $R^g$ can, when comprising an appropriate number of carbon atoms, be straight chain, cyclic, bicyclic, branched, saturated, or unsaturated. In an embodiment, $R^{a'}$ and $R^{b'}$ are each independently $C_{1-4}$ alkyl, $R^g$ is $C_{1-4}$ alkyl, r and s are each 1, and t is 0 to 5. In another specific embodiment, $R^{a'}$, $R^{b'}$ and $R^g$ are each methyl, r and s are each 1, and t is 0 or 3. In another exemplary embodiment, the cyclohexylidene-bridged bisphenol is the reaction product of two moles of a cresol with one mole of a hydrogenated isophorone (e.g., 1,1,3-trimethyl-3-cyclohexane-5-one). $X^a$ in bisphenol (3) can also be a substituted $C_{3-18}$ cycloalkylidene (5)

(5)

wherein $R^r$, $R^p$, $R^q$, and $R^t$ are independently hydrogen, halogen, oxygen, or $C_{1-12}$ organic groups; I is a direct bond, a carbon, or a divalent oxygen, sulfur, or —N(Z)— where Z is hydrogen, halogen, hydroxy, $C_{1-12}$ alkyl, $C_{1-12}$ alkoxy, or $C_{1-12}$ acyl; h is 0 to 2, j is 1 or 2, i is an integer of 0 or 1, and k is an integer of 0 to 3, with the proviso that at least two of $R^r$, $R^p$, $R^q$, and $R^t$ taken together are a fused cycloaliphatic, aromatic, or heteroaromatic ring. It will be understood that where the fused ring is aromatic, the ring as shown in formula (5) will have an unsaturated carbon-carbon linkage were the ring is fused. When k is one and i is 0, the ring as shown in formula (5) contains 4 carbon atoms, when k is 2, the ring as shown in formula (5) contains 5 carbon atoms, and when k is 3, the ring contains 6 carbon atoms. In an embodiment, two adjacent groups (e.g., $R^q$ and $R^t$ taken together) form an aromatic group, and in another embodiment, $R^q$ and $R^t$ taken together form one aromatic group and $R^r$ and $R^p$ taken together form a second aromatic group. When $R^q$ and $R^t$ taken together form an aromatic group, $R^p$ can be a double-bonded oxygen atom, i.e., a ketone.

In another specific embodiment of the bisphenol compound (3), the $C_{1-18}$ organic bridging group includes groups —C($R^c$)($R^d$)— or —C(=$R^e$)—, wherein $R^c$ and $R^d$ are each independently a hydrogen atom or a monovalent $C_{1-6}$ linear or cyclic hydrocarbon group and $R^e$ is a divalent hydrocarbon group, p and q is each 0 or 1, and $R^a$ and $R^b$ are each a $C_{1-3}$ alkyl group, specifically methyl, disposed meta to the hydroxy group on each arylene group.

Other useful aromatic dihydroxy compounds of the formula HO—$R^1$—OH include aromatic dihydric compounds (6)

(6)

wherein each $R^h$ is independently a halogen atom, a hydrocarbyl such as a $C_{1-10}$ alkyl group, a halogen-substituted $C_{1-10}$ alkyl group, a $C_{6-10}$ aryl group, or a halogen-substituted $C_{6-10}$ aryl group, and n is 0 to 4. The halogen is usually bromine.

Some illustrative examples of specific aromatic dihydroxy compounds include the following: 4,4'-dihydroxybiphenyl, 1,6-dihydroxynaphthalene, 2,6-dihydroxynaphthalene, bis(4-hydroxyphenyl)methane, bis(4-hydroxyphenyl)diphenylmethane, bis(4-hydroxyphenyl)-1-naphthylmethane, 1,2-bis(4-hydroxyphenyl)ethane, 1,1-bis(4-hydroxyphenyl)-1-phenylethane, 2-(4-hydroxyphenyl)-2-(3-hydroxyphenyl) propane, bis(4-hydroxyphenyl)phenylmethane, 2,2-bis(4-hydroxy-3-bromophenyl)propane, 1,1-bis(hydroxyphenyl)cyclopentane, 1,1-bis(4-hydroxyphenyl)cyclohexane, 1,1-bis(4-hydroxyphenyl)isobutene, 1,1-bis(4-hydroxyphenyl)cyclododecane, trans-2,3-bis(4-hydroxyphenyl)-2-butene, 2,2-bis(4-hydroxyphenyl)adamantane, alpha, alpha'-bis(4-hydroxyphenyl)toluene, bis(4-hydroxyphenyl)acetonitrile, 2,2-bis(3-methyl-4-hydroxyphenyl)propane, 2,2-bis(3-ethyl-4-hydroxyphenyl)propane, 2,2-bis(3-n-propyl-4-hydroxyphenyl)propane, 2,2-bis(3-isopropyl-4-hydroxyphenyl)propane, 2,2-bis(3-sec-butyl-4-hydroxyphenyl)propane, 2,2-bis(3-t-butyl-4-hydroxyphenyl)propane, 2,2-bis(3-cyclohexyl-4-hydroxyphenyl)propane, 2,2-bis(3-allyl-4-hydroxyphenyl)propane, 2,2-bis(3-methoxy-4-hydroxyphenyl)propane, 2,2-bis(4-hydroxyphenyl)hexafluoropropane, 1,1-dichloro-2,2-bis(4-hydroxyphenyl)ethylene, 1,1-dibromo-2,2-bis(4-hydroxyphenyl)ethylene, 1,1-dichloro-2,2-bis(5-phenoxy-4-hydroxyphenyl)ethylene, 4,4'-dihydroxybenzophenone, 3,3-bis(4-hydroxyphenyl)-2-butanone, 1,6-bis(4-hydroxyphenyl)-1,6-hexanedione, ethylene glycol bis(4-hydroxyphenyl)ether, bis(4-hydroxyphenyl)ether, bis(4-hydroxyphenyl)sulfide, bis(4-hydroxyphenyl)sulfoxide, bis(4-hydroxyphenyl)sulfone, 9,9-bis(4-hydroxyphenyl)fluorine, 2,7-dihydroxypyrene, 6,6'-dihydroxy-3,3,3',3''-tetramethylspiro(bis)indane ("spirobiindane bisphenol"), 3,3-bis(4-hydroxyphenyl)phthalimide, 2,6-dihydroxydibenzo-p-dioxin, 2,6-dihydroxythianthrene, 2,7-dihydroxyphenoxathin, 2,7-dihydroxy-9,10-dimethylphenazine, 3,6-dihydroxydibenzofuran, 3,6-dihydroxydibenzothiophene, and 2,7-dihydroxycarbazole, resorcinol, substituted resorcinol compounds such as 5-methyl resorcinol, 5-ethyl resorcinol, 5-propyl resorcinol, 5-butyl resorcinol, 5-t-butyl resorcinol, 5-phenyl resorcinol, 5-cumyl resorcinol, 2,4,5,6-tetrafluoro resorcinol, 2,4,5,6-tetrabromo resorcinol, or the like; catechol; hydroquinone; substituted hydroquinones such as 2-methyl hydroquinone, 2-ethyl hydroquinone, 2-propyl hydroquinone, 2-butyl hydroquinone, 2-t-butyl hydroquinone, 2-phenyl hydroquinone, 2-cumyl hydroquinone, 2,3,5,6-tetramethyl hydroquinone, 2,3,5,6-tetra-t-butyl hydroquinone, 2,3,5,6-tetrafluoro hydroquinone, 2,3,5,6-tetrabromo hydroquinone, or the like, or combinations comprising at least one of the foregoing dihydroxy compounds.

Specific examples of bisphenol compounds (3) include 1,1-bis(4-hydroxyphenyl)methane, 1,1-bis(4-hydroxyphenyl)ethane, 2,2-bis(4-hydroxyphenyl) propane (also known as "bisphenol A" or "BPA"), 2,2-bis(4-hydroxyphenyl) butane, 2,2-bis(4-hydroxyphenyl)octane, 1,1-bis(4-hydroxyphenyl) propane, 1,1-bis(4-hydroxyphenyl) n-butane, 2,2-bis(4-hydroxy-2-methylphenyl) propane, 1,1-bis(4-hydroxy-t-butylphenyl) propane, 3,3-bis(4-hydroxyphenyl) phthalimidine, 2-phenyl-3,3-bis(4-hydroxyphenyl) phthalimidine (PPPBP), and 1,1-bis(4-hydroxy-3-methylphenyl)cyclohexane (DMBPC). Combinations comprising at least one of the foregoing dihydroxy compounds can also be used. In one specific embodiment, the polycarbonate is a linear homopolymer derived from bisphenol A, in which each of $A^1$ and $A^2$ is p-phenylene and $Y^1$ is isopropylidene in formula (13).

"Polycarbonate" as used herein includes homopolycarbonates (wherein each $R^1$ in the polymer is the same), copolymers comprising different $R^1$ moieties in the carbonate units (referred to herein as "copolycarbonates"), copolymers comprising carbonate units and other types of polymer units (such as ester units, diorganosiloxane units, urethane units, arylene ether units, arylene sulfone units, arylene ketone units, and combinations thereof), and combinations comprising at least one homopolycarbonate and/or copolycarbonate. As used herein, a "combination" is inclusive of blends, mixtures, alloys, reaction products, and the like. A specific polycarbonate copolymer is a poly(carbonate-ester). Such copolymers further contain, in addition to recurring carbonate units (1), repeating units (7)

(7)

wherein J is a divalent group derived from a dihydroxy compound, and can be, for example, a $C_{2-10}$ alkylene group, a $C_{6-20}$ alicyclic group, a $C_{6-20}$ aromatic group or a polyoxyalkylene group in which the alkylene groups contain 2 to 6 carbon atoms, specifically 2, 3, or 4 carbon atoms; and T divalent group derived from a dicarboxylic acid, and can be, for example, a $C_{2-10}$ alkylene group, a $C_{6-20}$ alicyclic group, a $C_{6-20}$ alkyl aromatic group, or a $C_{6-20}$ aromatic group. Poly (carbonate-ester)s containing a combination of different T and/or J groups can be used. The poly(carbonate-ester)s can be branched or linear.

In an embodiment, J is a $C_{2-30}$ alkylene group having a straight chain, branched chain, or cyclic (including polycyclic) structure. In another embodiment, J is derived from an aromatic dihydroxy compound (3). In another embodiment, J is derived from an aromatic dihydroxy compound (4). In another embodiment, J is derived from an aromatic dihydroxy compound (6).

Exemplary aromatic dicarboxylic acids that can be used to prepare the polyester units include isophthalic or terephthalic acid, 1,2-di(p-carboxyphenyl)ethane, 4,4'-dicarboxydiphenyl ether, 4,4'-bisbenzoic acid, or a combination comprising at least one of the foregoing acids.

Acids containing fused rings can also be present, such as in 1,4-, 1,5-, or 2,6-naphthalenedicarboxylic acids. Specific dicarboxylic acids include terephthalic acid, isophthalic acid, naphthalene dicarboxylic acid, cyclohexane dicarboxylic acid, or a combination comprising at least one of the foregoing acids. A specific dicarboxylic acid comprises a combination of isophthalic acid and terephthalic acid wherein the weight ratio of isophthalic acid to terephthalic acid is 91:9 to 2:98. In another specific embodiment, J is a $C_{2-6}$ alkylene group and T is p-phenylene, m-phenylene, naphthalene, a divalent cycloaliphatic group, or a combination thereof.

The molar ratio of carbonate units to ester units in the copolymers can vary broadly, for example 1:99 to 99:1, specifically 10:90 to 90:10, more specifically 25:75 to 75:25, depending on the desired properties of the final composition.

A specific embodiment of a poly(carbonate-ester) (8) comprises recurring aromatic carbonate and aromatic ester units (8)

wherein Ar is divalent aromatic residue of a dicarboxylic acid or combination of dicarboxylic acids, and Ar' is a divalent aromatic residue of a bisphenol (3) or a dihydric compound (6). Ar is thus an aryl group, and is preferably the residue of isophthalic acid (9a), terephthalic acid (9b), (9a)

(9b)

or a combination thereof. Ar' may be polycyclic, e.g., a residue of biphenol or bisphenol A, or monocyclic, e.g., the residue of hydroquinone or resorcinol.

Further in the poly(carbonate-ester) (8), x and y represent the respective parts by weight of the aromatic ester units and the aromatic carbonate units based on 100 parts total weight of the copolymer. Specifically, x, the aromatic ester content, is 20 to less than 100, specifically 30 to 95, still more specifically 50 to 95 parts by weight, and y, the carbonate content, is from more than zero to 80, from 5 to 70, still more specifically from 5 to 50 parts by weight. In general, any aromatic dicarboxylic acid conventionally used in the preparation of polyesters may be utilized in the preparation of poly(carbonate-ester)s (8) but terephthalic acid alone can be used, or mixtures thereof with isophthalic acid wherein the weight ratio of terephthalic acid to isophthalic acid is in the range of from 5:95 to 95:5. In this embodiment the poly(carbonate-ester) (8) can be derived from reaction of bisphenol-A and phosgene with iso- and terephthaloyl chloride, and can have an intrinsic viscosity of 0.5 to 0.65 deciliters per gram (measured in methylene chloride at a temperature of 25° C.

In another specific embodiment, the poly(carbonate-ester) comprises carbonate units (1) derived from a bisphenol compound (3), and ester units derived from an aromatic dicarboxylic acid and dihydroxy compound (6). Specifically, the ester units are arylate ester units (9)

(9)

wherein each $R^4$ is independently a halogen or a $C_{1-4}$ alkyl, and p is 0 to 3. The arylate ester units can be derived from the reaction of a mixture of terephthalic acid and isophthalic acid or chemical equivalents thereof with compounds such as 5-methyl resorcinol, 5-ethyl resorcinol, 5-propyl resorcinol, 5-butyl resorcinol, 5-t-butyl resorcinol, 2,4,5-trifluoro resorcinol, 2,4,6-trifluoro resorcinol, 4,5,6-trifluoro resorcinol, 2,4,5-tribromo resorcinol, 2,4,6-tribromo resorcinol, 4,5,6-tribromo resorcinol, catechol, hydroquinone, 2-methyl hydroquinone, 2-ethyl hydroquinone, 2-propyl hydroquinone, 2-butyl hydroquinone, 2-t-butyl hydroquinone, 2,3,5-trimethyl hydroquinone, 2,3,5-tri-t-butyl hydroquinone, 2,3,5-trifluoro hydroquinone, 2,3,5-tribromo hydroquinone, or a combination comprising at least one of the foregoing compounds. The ester units can be poly(isophthalate-terephthalate-resorcinol ester) units, also known as "ITR" esters.

The poly(carbonate-ester)s comprising ester units (9) can comprise, based on the total weight of the copolymer, from 1 to less than 100 wt. %, 10 to less than 100 wt. %, 20 to less than 100 wt %, or 40 to less than 100 wt. % of carbonate units (1) derived from a bisphenol compound (3), and from greater than 0 to 99 wt. %, greater than 0 to 90 wt. %, greater than 0 to 80 wt. %, or greater than 0 to 60 wt. % of ester units derived from an aromatic dicarboxylic acid and dihydroxy compound (6). A specific poly(carbonate-ester) comprising arylate ester units (9) is a poly(bisphenol-A carbonate)-co-poly(isophthalate-terephthalate-resorcinol ester). In another specific embodiment, the poly(carbonate-ester) contains carbonate units (1) derived from a combination of a bisphenol (3) and an aromatic dihydric compound (6), and arylate ester units (9). The molar ratio of carbonate units derived from bisphenol (3) to carbonate units derived from aromatic dihydric compound (6) can be 1:99 to 99:1. A specific poly(carbonate-ester) of this type is a poly(bisphenol-A carbonate)-co-(resorcinol carbonate)-co(isophthalate terephthalate-resorcinol ester).

The polycarbonates can further comprise siloxane units, for example, a poly(carbonate-siloxane) or a poly(carbonate-ester-siloxane). The siloxane units are present in the copolymer in polysiloxane blocks, which comprise repeating siloxane units (10)

(10)

wherein each R is independently the same or different $C_{1-13}$ monovalent organic group. For example, R can be a $C_1$-$C_{13}$ alkyl, $C_1$-$C_{13}$ alkoxy, $C_2$-$C_{13}$ alkenyl group, $C_2$-$C_{13}$ alkenyloxy, $C_3$-$C_6$ cycloalkyl, $C_3$-$C_6$ cycloalkoxy, $C_6$-$C_{14}$ aryl, $C_6$-$C_{10}$ aryloxy, $C_7$-$C_{13}$ arylalkyl, $C_7$-$C_{13}$ aralkoxy, $C_7$-$C_{13}$ alkylaryl, or $C_7$-$C_{13}$ alkylaryloxy. The foregoing groups can be fully or partially halogenated with fluorine, chlorine, bromine, or iodine, or a combination thereof. In an embodiment, where a transparent polysiloxane-polycarbonate is desired, R is unsubstituted by halogen. Combinations of the foregoing R groups can be used in the same copolymer. The value of E in formula (10) can vary depending on the type and relative amount of each component in the composition, the desired properties of the, and like considerations. Generally, E has an average value of 5 to 50, specifically 5 to about 40, more specifically 10 to 30. A combination of a first and a second (or more) copolymers can be used, wherein the average value of E of the first copolymer is less than the average value of E of the second copolymer.

In an embodiment, the polysiloxane blocks are of formula (11) or (12)

(11)

(12)

wherein E is as defined in siloxane (10) and each R can be the same or different, and is as defined in siloxane (1). Each Ar in blocks (11) and (12) can be the same or different, and is a substituted or unsubstituted $C_6$-$C_{30}$ arylene group, wherein the bonds are directly connected to an aromatic moiety. The Ar groups in (11) can be derived from a bisphenol (3), for example 1,1-bis(4-hydroxyphenyl)methane, 1,1-bis(4-hydroxyphenyl)ethane, 2,2-bis(4-hydroxyphenyl) propane, 2,2-bis(4-hydroxyphenyl) butane, 2,2-bis(4-hydroxyphenyl) octane, 1,1-bis(4-hydroxyphenyl) propane, 1,1-bis(4-hydroxyphenyl) n-butane, 2,2-bis(4-hydroxy-1-methylphenyl) propane, 1,1-bis(4-hydroxyphenyl)cyclohexane, bis(4-hydroxyphenyl sulfide), and 1,1-bis(4-hydroxy-4-butylphenyl) propane. Combinations comprising at least one of the foregoing compounds can also be used. Each $R^5$ in formula (12) is independently a divalent $C_1$-$C_{30}$ organic group, for example a divalent $C_2$-$C_8$ aliphatic group.

In a specific embodiment, the polysiloxane blocks are of formula (13):

(13)

wherein R and E are as defined in formula (10); $R^6$ is a divalent $C_2$-$C_8$ aliphatic group; each M is independently a halogen, cyano, nitro, $C_1$-$C_8$ alkylthio, $C_1$-$C_8$ alkyl, $C_1$-$C_8$ alkoxy, $C_2$-$C_8$ alkenyl, $C_2$-$C_8$ alkenyloxy group, $C_3$-$C_8$ cycloalkyl, $C_3$-$C_8$ cycloalkoxy, $C_6$-$C_{10}$ aryl, $C_6$-$C_{10}$ aryloxy, $C_7$-$C_{12}$ aralkyl, $C_7$-$C_{12}$ aralkoxy, $C_7$-$C_{12}$ alkylaryl, or $C_7$-$C_{12}$ alkylaryloxy, wherein each n is independently 0, 1, 2, 3, or 4. In an embodiment, M is bromo or chloro, an alkyl group such as methyl, ethyl, or propyl, an alkoxy group such as methoxy, ethoxy, or propoxy, or an aryl group such as phenyl, chlorophenyl, or tolyl; $R^2$ is a dimethylene, trimethylene or tetramethylene group; and R is a $C_{1-8}$ alkyl, haloalkyl such as trifluoropropyl, cyanoalkyl, or $C_{6-8}$ aryl such as phenyl, chlorophenyl or tolyl. In another embodiment, R is methyl, or a combination of methyl and trifluoropropyl, or a combination of methyl and phenyl. In still another embodiment, M is methoxy, n is one, $R^2$ is a divalent $C_1$-$C_3$ aliphatic group, and R is methyl.

In an embodiment, the polycarbonate is a poly(carbonate-siloxane) comprises carbonate units (1) derived from a bisphenol (3), specifically bisphenol A, and siloxane units (13) wherein M is methoxy, n is one, $R^2$ is a divalent $C_1$-$C_3$ aliphatic group, and R is methyl. The poly(carbonate-siloxane)s can comprise 50 to 99 wt. % of carbonate units and 1 to 50 wt. % siloxane units. Within this range, the poly(carbonate-siloxane)s can comprise 70 to 98 wt. %, more specifically 75 to 97 wt. % of carbonate units and 2 to 30 wt. %, more specifically 3 to 25 wt. % siloxane units.

In another embodiment, the polycarbonate is a poly(carbonate-ester-siloxane) comprising carbonate units (1) derived from a bisphenol (3), specifically bisphenol A; siloxane units (13) wherein M is methoxy, n is one, $R^2$ is a divalent $C_1$-$C_3$ aliphatic group, and R is methyl and ester units (9), specifically (isophthalate-terephthalate-resorcinol) ester units.

Polycarbonates can be manufactured by processes such as interfacial polymerization and melt polymerization. Although the reaction conditions for interfacial polymerization can vary, an exemplary process generally involves dissolving or dispersing a dihydric phenol reactant in aqueous caustic soda or potash, adding the resulting mixture to a water-immiscible solvent medium, and contacting the reactants with a carbonate precursor in the presence of a catalyst such as triethylamine and/or a phase transfer catalyst, under controlled pH conditions, e.g., 8 to 12. The most commonly used water immiscible solvents include methylene chloride, 1,2-dichloroethane, chlorobenzene, toluene, and the like.

Exemplary carbonate precursors include a carbonyl halide such as carbonyl bromide or carbonyl chloride, or a haloformate such as a bishaloformates of a dihydric phenol (e.g., the bischloroformates of bisphenol A, hydroquinone, or the like) or a glycol (e.g., the bishaloformate of ethylene glycol, neopentyl glycol, polyethylene glycol, or the like). Combinations comprising at least one of the foregoing types of carbonate precursors can also be used. In an exemplary embodiment, an interfacial polymerization reaction to form carbonate linkages uses phosgene as a carbonate precursor, and is referred to as a phosgenation reaction.

Among the phase transfer catalysts that can be used are catalysts of the formula $(R^3)_4Q^+X$, wherein each $R^3$ is the same or different, and is a $C_{1-10}$ alkyl group; Q is a nitrogen or phosphorus atom; and X is a halogen atom or a $C_{1-8}$ alkoxy group or $C_{6-18}$ aryloxy group. Exemplary phase transfer catalysts include, for example, $[CH_3(CH_2)_3]_4NX$, $[CH_3(CH_2)_3]_4PX$, $[CH_3(CH_2)_5]_4NX$, $[CH_3(CH_2)_6]_4NX$, $[CH_3(CH_2)_4]_4NX$, $CH_3[CH_3(CH_2)_3]_3NX$, and $CH_3[CH_3(CH_2)_2]_3NX$, wherein X is Cl$^-$, Br$^-$, a $C_{1-8}$ alkoxy group or a $C_{6-18}$ aryloxy group. An effective amount of a phase transfer catalyst can be 0.1 to 10 wt % based on the weight of bisphenol in the phosgenation mixture. In another embodiment an effective amount of phase transfer catalyst can be 0.5 to 2 wt % based on the weight of bisphenol in the phosgenation mixture.

All types of polycarbonate end groups are contemplated as being useful in the polycarbonate composition, provided that such end groups do not significantly adversely affect desired properties of the compositions.

Branched polycarbonate blocks can be prepared by adding a branching agent during polymerization. These branching agents include polyfunctional organic compounds containing at least three functional groups selected from hydroxyl, carboxyl, carboxylic anhydride, haloformyl, and mixtures of the foregoing functional groups. Specific examples include trimellitic acid, trimellitic anhydride, trimellitic trichloride, tris-p-hydroxy phenyl ethane, isatin-bis-phenol, tris-phenol TC (1,3,5-tris((p-hydroxyphenyl)isopropyl)benzene), tris-phenol PA (4(4(1,1-bis(p-hydroxyphenyl)-ethyl) alpha, alpha-dimethyl benzyl)phenol), 4-chloroformyl phthalic anhydride, trimesic acid, and benzophenone tetracarboxylic acid. The branching agents can be added at a level of 0.05 to 2.0 wt %. Mixtures comprising linear polycarbonates and branched polycarbonates can be used.

A chain stopper (also referred to as a capping agent) can be included during polymerization. The chain stopper limits molecular weight growth rate, and so controls molecular weight in the polycarbonate. Exemplary chain stoppers include certain mono-phenolic compounds, mono-carboxylic acid chlorides, and/or mono-chloroformates. Mono-phenolic chain stoppers are exemplified by monocyclic phenols such as phenol and $C_1$-$C_{22}$ alkyl-substituted phenols such as p-cumyl-phenol, resorcinol monobenzoate, and p- and tertiary-butyl phenol; and monoethers of diphenols, such as p-methoxyphenol. Alkyl-substituted phenols with branched chain alkyl substituents having 8 to 9 carbon atom can be specifically mentioned. Certain mono-phenolic UV absorbers can also be used as a capping agent, for example 4-substituted-2-hydroxybenzophenones and their derivatives, aryl salicylates, monoesters of diphenols such as resorcinol monobenzoate, 2-(2-hydroxyaryl)-benzotriazoles and their derivatives, 2-(2-hydroxyaryl)-1,3,5-triazines and their derivatives, and the like.

Mono-carboxylic acid chlorides can also be used as chain stoppers. These include monocyclic, mono-carboxylic acid chlorides such as benzoyl chloride, $C_1$-$C_{22}$ alkyl-substituted benzoyl chloride, toluoyl chloride, halogen-substituted benzoyl chloride, bromobenzoyl chloride, cinnamoyl chloride, 4-nadimidobenzoyl chloride, and combinations thereof; polycyclic, mono-carboxylic acid chlorides such as trimellitic anhydride chloride, and naphthoyl chloride; and combinations of monocyclic and polycyclic mono-carboxylic acid chlorides. Chlorides of aliphatic monocarboxylic acids with less than or equal to 22 carbon atoms are useful. Functionalized chlorides of aliphatic monocarboxylic acids, such as acryloyl chloride and methacryoyl chloride, are also useful. Also useful are mono-chloroformates including monocyclic, mono-chloroformates, such as phenyl chloroformate, alkyl-substituted phenyl chloroformate, p-cumyl phenyl chloroformate, toluene chloroformate, and combinations thereof.

Alternatively, melt processes can be used to make the polycarbonates. Generally, in the melt polymerization process, polycarbonates can be prepared by co-reacting, in a molten state, the dihydroxy reactant(s) and a diaryl carbonate ester, such as diphenyl carbonate, in the presence of a transesterification catalyst in a Banbury® mixer, twin screw extruder, or the like to form a uniform dispersion. Volatile monohydric phenol is removed from the molten reactants by distillation and the polymer is isolated as a molten residue. A specifically useful melt process for making polycarbonates uses a diaryl carbonate ester having electron-withdrawing substituents on the aryls. Examples of specifically useful diaryl carbonate esters with electron withdrawing substituents include bis(4-nitrophenyl)carbonate, bis(2-chlorophenyl)carbonate, bis(4-chlorophenyl)carbonate, bis(methyl salicyl)carbonate, bis(4-methylcarboxylphenyl) carbonate, bis(2-acetylphenyl) carboxylate, bis(4-acetylphenyl) carboxylate, or a combination comprising at least one of the foregoing esters. In addition, useful transesterification catalysts can include phase transfer catalysts of formula $(R^3)_4Q^+X$, wherein each $R^3$, Q, and X are as defined above. Exemplary transesterification catalysts include tetrabutylammonium hydroxide, methyltributylammonium hydroxide, tetrabutylammonium acetate, tetrabutylphosphonium hydroxide, tetrabutylphosphonium acetate, tetrabutylphosphonium phenolate, or a combination comprising at least one of the foregoing.

The polyester-polycarbonates in particular can also be prepared by interfacial polymerization as described above with respect to polycarbonates generally. Rather than utilizing the dicarboxylic acid or diol per se, the reactive derivatives of the acid or diol, such as the corresponding acid halides, in particular the acid dichlorides and the acid dibromides can be used. Thus, for example instead of using isophthalic acid, terephthalic acid, or a combination comprising at least one of the foregoing acids, isophthaloyl dichloride, terephthaloyl dichloride, or a combination comprising at least one of the foregoing dichlorides can be used.

The polycarbonates can have an intrinsic viscosity, as determined in chloroform at 25° C., of 0.3 to 1.5 deciliters per gram (dl/gm), specifically 0.45 to 1.0 dl/gm. The polycarbonates can have a weight average molecular weight of 10,000 to 200,000 Daltons, specifically 20,000 to 100,000 Daltons, as measured by gel permeation chromatography (GPC), using a crosslinked styrene-divinylbenzene column and calibrated to polycarbonate references. GPC samples are prepared at a concentration of 1 mg per ml, and are eluted at a flow rate of 1.5 ml per minute. Combinations of polycarbonates of different flow properties can be used to achieve the overall desired flow property. In an embodiment polycarbonates are based on bisphenol A, in which each of $A^3$ and $A^4$ is p-phenylene and $Y^2$ is isopropylidene. The weight average molecular weight of the polycarbonate can be 5,000 to 100,000 Daltons, or, more specifically 10,000 to 65,000 Daltons, or, even more specifically, 15,000 to 35,000 Daltons as determined by GPC as described above.

The polyester-polycarbonates in particular are generally of high molecular weight and have an intrinsic viscosity, as determined in chloroform at 25° C. of 0.3 to 1.5 dl/gm, and preferably from 0.45 to 1.0 dl/gm. These polyester-polycarbonates may be branched or unbranched and generally will have a weight average molecular weight of from 10,000 to 200,000, preferably from 20,000 to 100,000 as measured by GPC as described above.

The poly(carbonate-siloxane)s can have a weight average molecular weight of 2,000 to 100,000 Daltons, specifically 5,000 to 50,000 Daltons as measured by gel permeation chromatography using a crosslinked styrene-divinyl benzene column, at a sample concentration of 1 milligram per milliliter, and as calibrated with polycarbonate standards. The poly (carbonate-siloxane) can have a melt volume flow rate, measured at 300° C./1.2 kg, of 1 to 50 cubic centimeters per 10 minutes (cc/10 min), specifically 2 to 30 cc/10 mM. Mixtures of polyorganosiloxane-polycarbonates of different flow properties can be used to achieve the overall desired flow property.

The foregoing polycarbonates can be used alone or in combination, for example a combination of a homopolycarbonate and one or more poly(carbonate-ester)s, or a combination of two or more poly(carbonate-ester)s. Blends of different polycarbonate-esters may be used in these compositions.

In one embodiment, the at least one polycarbonate comprises a brominated polycarbonate copolymer. In one embodiment, the at least one polycarbonate polymer is bisphenol-A polycarbonate. In one embodiment, a substantially pure bisphenol-A polycarbonate is obtained.

The method can contain additional steps. In one embodiment, the method further includes filtering insoluble materials from the composition. In another version of the invention, the method further comprises dissolving at least one polymer component of the composition in a solvent prior to separating the at least one polycarbonate polymer by liquid chromatography.

The solvent that can be used can be any solvent, which when used in accordance to the invention, enables the removal of polycarbonate. In one embodiment, the solvent is selected from the group of alkylene halides, tetrahydrofurans, N-methylpyrrolidone (NMP), phenols dimethyl acetamide. In another embodiment, the solvent is methylene chloride.

The method can be performed in any suitable system arrangement. In one embodiment, the method further comprises performing the chromatography in a stationary bed column. In another embodiment, the method further comprises performing the chromatography in a simulated moving-bed The invention will now be described in connection with the following Examples.

EXAMPLES

Example 1

Purpose:

The purpose of this Example was to separate bisphenol A polycarbonate from a complex mixture of polycarbonate blends. The separation of the bisphenol A polycarbonate is performed using liquid chromatography. Ideally, the bisphenol A polycarbonate is separated in a pure form from the large amount of other components in the mixture. The demonstration of the separation of the bisphenol A polycarbonate from the other mixture components by liquid chromatography demonstrates feasibility for the separation of bisphenol A polycarbonate on an industrial scale using chromatography, such as simulated moving bed chromatography.

Materials

| COMPONENT | CHEMICAL DESCRIPTION | SOURCE, VENDOR |
| --- | --- | --- |
| LEXAN* 143R-7C013 | Poly (bisphenol-A-carbonate) [CASRN 111211-39-3] | SABIC INNOVATIVE PLASTICS |
| LEXAN* 3412R-BL3146 | Poly (bisphenol-A-carbonate) [CASRN 111211-39-3] with Fibrous glass and Titanium Dioxide | SABIC INNOVATIVE PLASTICS |
| LEXAN* ML5369-739 | Poly (bisphenol-A-carbonate) [CASRN 111211-39-3] with Fibrous glass and Carbon Black | SABIC INNOVATIVE PLASTICS |
| LEXAN* 503-3381 | Poly (bisphenol-A-carbonate) [CASRN 111211-39-3] with Fibrous Glass | SABIC INNOVATIVE PLASTICS |

Techniques and Procedures

The techniques and procedures used in Example 1 are discussed below.

Sample Preparation Process

In Example 1, 0.1 g of pellets of each of the polycarbonate blends (143R-7C013, 3412R-BL3146, ML5369-739, and 503-3381) were weighed in a scintillation vial. 10 mL of methylene chloride was added to the vial. After the vial was shaken for 30 minutes, the solution was filtered using a 0.45 μm PTFE syringe filter to separate the components which are insoluble in methylene chloride such as the inorganic pigments.

Bisphenol A Polycarbonate Separation Process

The separation in Example 1 was performed using high performance liquid chromatography. A sample volume of 10 μL was injected onto an Alltech Inertsil Silica-5μ column having dimensions of 150 mm×4.6 mm. A gradient elution was used going from 100% cyclohexane to 100% tetrahydrofuran over 15 minutes at a constant flow rate of 1.0 ml/min. The system was then held at 100% tetrahydrofuran for 5 minutes. An ultraviolet (UV) wavelength absorbance detector was monitored at 254 nm to detect the elution of the components of interest. The results for Example 1 are shown in FIG. 1.

Results

Figure 1:
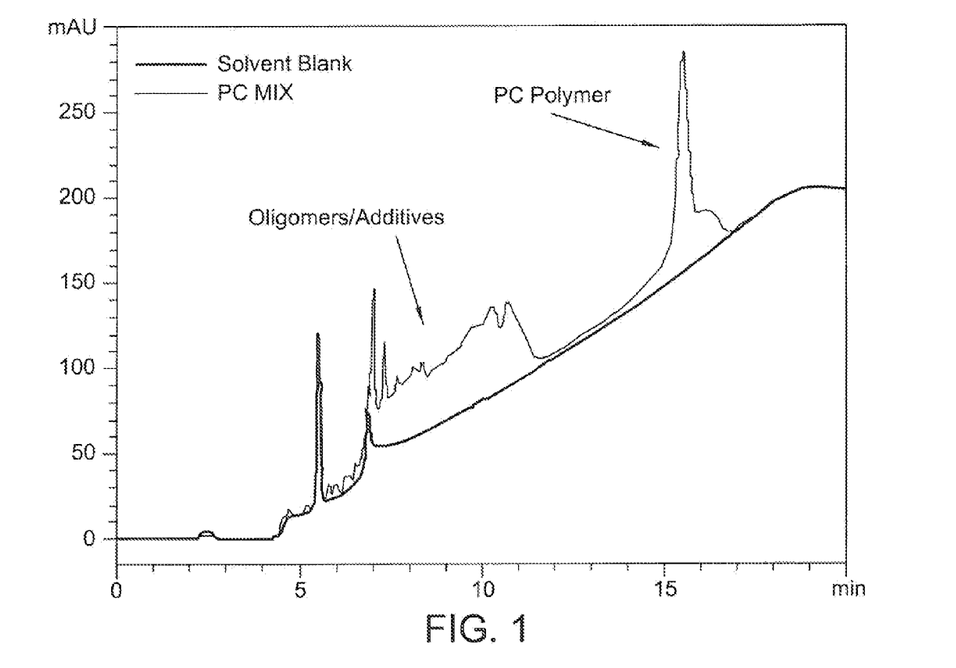
FIG. 1 is a graphic representation of the results of Example 1.

Liquid chromatography separation results for Example 1 are shown in FIG. 1.

Note to FIG. 1: The baseline signal at 254 nm increases due to the change in mobile phase composition.

Discussion

The mixture used in Example 1 contains a large range of components including: bisphenol A polycarbonate, brominated polycarbonate, a mold release, UV stabilizers, glass, an anti-drip agent, an FR synergist, a heat stabilizer, a phosphate stabilizer, titanium dioxide, carbon black, a blue phthalocyanine pigment, a blue dye, a green dye, and a brown pigment. The separation process used in Example 1 is effective in separating bisphenol A polycarbonate from the other components in the mixture as shown in FIG. 1. Because a distinct separation can be achieved using high performance liquid chromatography, separation of bisphenol A polycarbonate from similar mixtures by simulated moving bed chromatography would yield substantially pure bisphenol A polycarbonate.

Example 2

Purpose:

The purpose of this Example was to separate bisphenol A polycarbonate from a complex mixture of polycarbonate/ Acrylonitrile butadiene styrene (ABS) blends. The separation of the bisphenol A polycarbonate is performed using liquid chromatography. Ideally, the bisphenol A polycarbonate is separated in a pure form from the large amount of other components in the mixture. The demonstration of the separation of the bisphenol A polycarbonate from the other mixture components by liquid chromatography makes feasible the separation of bisphenol A polycarbonate on an industrial scale using chromatography, such as simulated moving bed chromatography.

Materials

| COMPONENT | CHEMICAL DESCRIPTION | SOURCE, VENDOR |
|---|---|---|
| CYCOLOY* CY5100 | Poly (bisphenol-A-carbonate) [CASRN 111211-39-3]/Poly (acrylonitrile-butadiene-styrene) [CASRN 9003-56-9] blend with flame retardant | SABIC Innovative Plastics |
| CYCOLOY* XCY620-WH90527 | Poly (bisphenol-A-carbonate) [CASRN 111211-39-3]/Poly (acrylonitrile-butadiene-styrene) [CASRN 9003-56-9] blend with Titanium Dioxide | SABIC Innovative Plastics |
| CYCOLOY* C2950 | Poly (bisphenol-A-carbonate) [CASRN 111211-39-33/Poly (acrylonitrile-butadiene-styrene) [CASRN 9003-56-9] blend with flame retardant | SABIC Innovative Plastics |
| CYCOLOY* XCM840 | Poly (bisphenol-A-carbonate) [CASRN 111211-39-3]/Poly (styreneacrylonitrile) [CASRN 9003-54-7] blend with Talc | SABIC Innovative Plastics |

Techniques and Procedures

The techniques and procedures used in Example 2 are discussed below.

Sample Preparation Process

In Example 2, 0.1 g of pellets of each of the polycarbonate/ABS blends (CY5100, XCY620-WH90527, C2950, and XCM840 were weighed in a scintillation vial. 10 mL of methylene chloride was added to the vial. After the vial was shaken for 30 minutes, the solution was filtered using a 0.45 µm PTFE syringe filter to separate the components which are insoluble in methylene chloride such as the inorganic pigments and crosslinked ABS polymer.

Bisphenol A Polycarbonate Separation Process

The process steps and conditions in Example 2 were the same as those used in Example 1. The results for Example 2 are shown in FIG. 2.

Results

Figure 2:
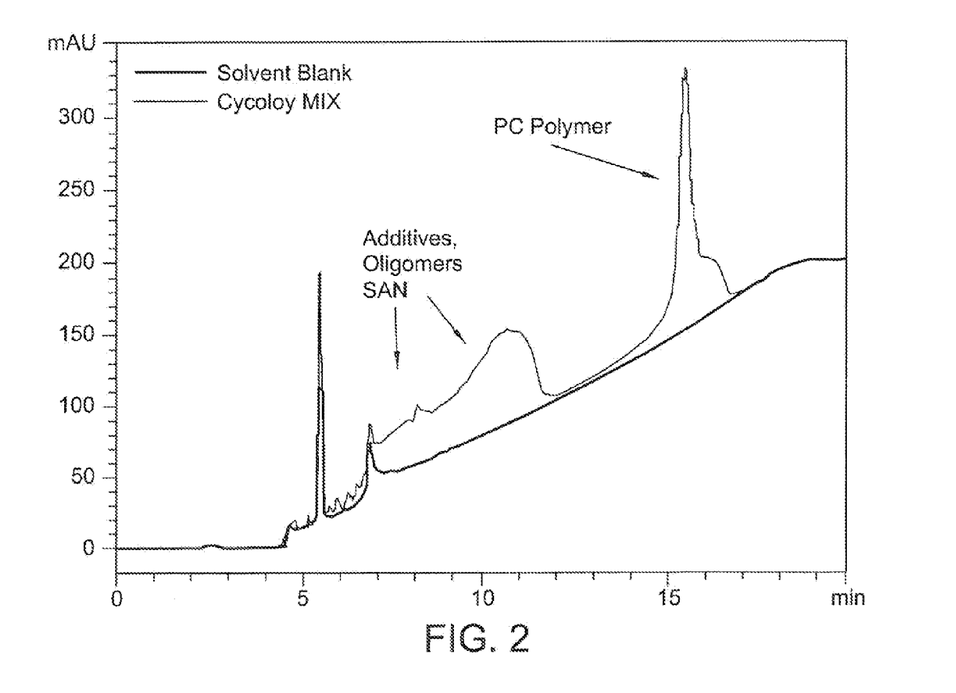
FIG. 2 is a graphic representation of the results of Example 2.

Liquid chromatography separation results for Example 2 are shown in FIG. 2.

Note: The baseline signal at 254 am increases due to the change in mobile phase composition.

Discussion

The mixture used in Example 2 contains a large range of components including: bisphenol A polycarbonate, bulk ABS, emulsion ABS, styrene acrylonitrile polymer, flame retardants bisphenol A diphenyl phosphate and resorcinol diphenyl phosphate, an anti-drip agent, an impact modifier, an anti-oxidant, a mold release, a phosphate stabilizer, a heat stabilizer, talc, a quencher, a red dye, a blue pigment, and a yellow pigment. The separation process used in Example 2 is effective in separating bisphenol A polycarbonate from the other components in the mixture as shown in FIG. 2. Because a distinct separation can be achieved using high performance liquid chromatography, separation of bisphenol A polycarbonate from similar mixtures by simulated moving bed chromatography would yield substantially pure bisphenol A polycarbonate.

Example 3

Purpose:

The purpose of this Example was to separate bisphenol A polycarbonate from a mixture of bisphenol A polycarbonate and a brominated polycarbonate copolymer. The separation of the bisphenol A polycarbonate is performed using liquid chromatography. Ideally, the bisphenol A polycarbonate is separated in a pure form from the brominated polycarbonate copolymer. The demonstration of the separation of the bisphenol A polycarbonate from the brominated polycarbonate copolymer by liquid chromatography makes feasible the separation of bisphenol A polycarbonate on an industrial scale using chromatography, such as simulated moving bed chromatography.

Materials

| COMPONENT | CHEMICAL DESCRIPTION | SOURCE, VENDOR |
|---|---|---|
| TBBPA/BPA COPOLYMER | TETRABROMOBISPHENOL A/BISPHENOL A POLYCARBONATE COPOLYMER | SABIC INNOVATIVE PLASTICS |
| 100 GRADE PC | BISPHENOL A POLYCARBONATE | SABIC INNOVATIVE PLASTICS |

Techniques and Procedures

The techniques and procedures used in Example 3 are discussed below.

Sample Preparation Process

In Example 3, 0.1 g of pellets of each of the polymers (TBBPA/BPA copolymer and 100 grade PC) were weighed into separate scintillation vials. 10 mL of methylene chloride was added to each vial. After the vials were shaken for 30 minutes to completely dissolve the polymers, the solution was filtered using a 0.45 µm PTFE syringe filter to remove any trace concentration level, insoluble material.

Bisphenol A Polycarbonate Separation Process

The separation in Example 3 was performed using high performance liquid chromatography. A sample volume of 10 µL was injected into an Alltech Inertsil Silica 5µ column having dimensions of 150 mm×4.6 mm. A gradient elution was used going from 100% acetonitrile to 100% tetrahydrofuran over 15 minutes at a constant flow rate of 0.8 ml/min. The system was then held at 100% tetrahydrofuran for 5 minutes. An ultraviolet (UV) wavelength absorbance detector was monitored at 254 nm to detect the elution of the components of interest. The results for Example 3 are shown in FIG. 3.

Figure 3:
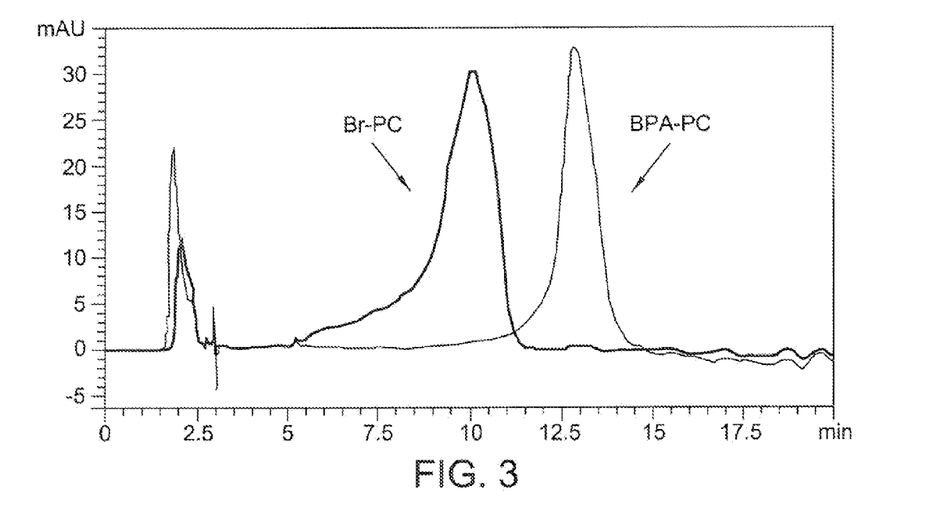
FIG. 3 is a graphic representation of the results of Example 3.

Note in connection with FIG. 3: The background signal due to the mobile phase gradient was subtracted from both sample analyses to show the separation of components more clearly.

Discussion

The separation process used in Example 3 is effective in separating bisphenol A polycarbonate from the brominated polycarbonate copolymer as shown in FIG. 3. Because a distinct separation can be achieved using high performance liquid chromatography, separation of bisphenol A polycarbonate from mixtures with brominated polycarbonate copolymers by simulated moving bed chromatography would yield substantially pure bisphenol A polycarbonate.

Example 4

Purpose:

The mixture used in Example 4 contains a large range of components including: bisphenol A polycarbonate, brominated polycarbonate, a mold release, UV stabilizers, glass, an anti-drip agent, an FR synergist, a heat stabilizer, a phosphate stabilizer, titanium dioxide, carbon black, a blue phthalocyanine pigment, a blue dye, a green dye, and a brown pigment. The purpose of this Example was to separate bisphenol A polycarbonate from a complex mixture of polycarbonate blends. The separation of the bisphenol A polycarbonate is performed using liquid chromatography. Ideally, the bisphenol A polycarbonate is separated in a pure form from the large amount of other components in the mixture. The demonstration of the separation of the bisphenol A polycarbonate from the other mixture components by liquid chromatography makes feasible the separation of bisphenol A polycarbonate on an industrial scale using chromatography, such as simulated moving bed chromatography.

Materials

| COMPONENT | CHEMICAL DESCRIPTION | SOURCE, VENDOR |
| --- | --- | --- |
| LEXAN* 143R-7C013 | Poly (bisphenol-A-carbonate) [CASRN 111211-39-3] | SABIC INNOVATIVE PLASTICS |
| LEXAN* 3412R-BL3146 | Poly (bisphenol-A-carbonate) [CASRN 111211-39-3] with Fibrous glass and Titanium Dioxide | SABIC INNOVATIVE PLASTICS |
| LEXAN* ML5369-739 | Poly (bisphenol-A-carbonate) [CASRN 111211-39-3] with Fibrous glass and Carbon Black | SABIC INNOVATIVE PLASTICS |
| LEXAN* 503-3381 | Poly (bisphenol-A-carbonate) [CASRN 111211-39-3] with Fibrous Glass | SABIC INNOVATIVE PLASTICS |

Techniques and Procedures

The techniques and procedures used in Example 4 are discussed below.

Sample Preparation Process

The sample preparation methods are the same as those used in Example 1.

Bisphenol A Polycarbonate Separation Process

The separation in Example 4 was performed using high performance liquid chromatography. A sample volume of 10 µL was injected onto an Alltech Inertsil Silica 5µ column having dimensions of 150 mm×4.6 mm. A gradient elution was used going from 100% methanol to 100% methylene chloride over 15 minutes at a constant flow rate of 1.0 ml/min. The system was then held at 100% methylene chloride for 5 minutes. An ultraviolet (UV) wavelength absorbance detector was monitored at 254 nm to detect the elution of the components of interest. The results for Example 4 are shown in FIG. 4.

Results

Figure 4:
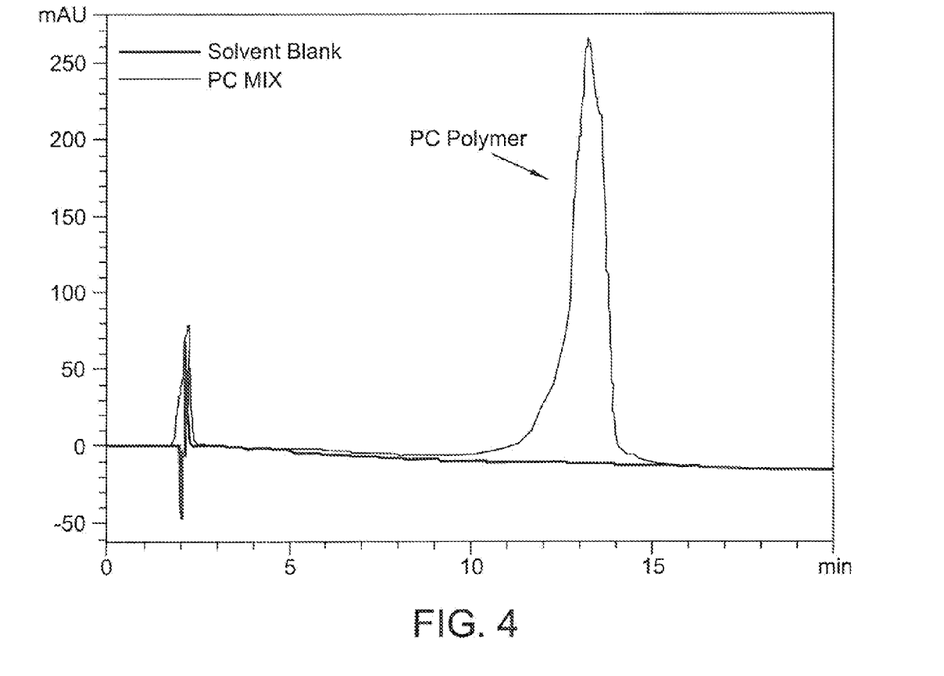
FIG. 4 is a graphic representation of the results of Example 4.

Liquid chromatography separation results for Example 4 are shown in FIG. 4.

Discussion

The separation process used in Example 4 is not effective in separating bisphenol A polycarbonate from the other components in the mixture as shown in FIG. 4. Because a distinct separation is not achieved using this separation process, separation of bisphenol A polycarbonate from similar mixtures by simulated moving bed chromatography would need different conditions to yield substantially pure bisphenol A polycarbonate.

Example 5

Purpose:

The purpose of this Example was to separate bisphenol A polycarbonate from a complex mixture of polycarbonate/Acrylonitrile butadiene styrene (ABS) blends. The separation of the bisphenol A polycarbonate is performed using liquid chromatography. Ideally, the bisphenol A polycarbonate is separated in a pure form from the large amount of other components in the mixture. The demonstration of the separation of the bisphenol A polycarbonate from the other mixture components by liquid chromatography makes feasible the separation of bisphenol A polycarbonate on an industrial scale using chromatography, such as simulated moving bed chromatography.

Materials

| COMPONENT | CHEMICAL DESCRIPTION | SOURCE, VENDOR |
| --- | --- | --- |
| CYCOLOY* CY5100 | Poly (bisphenol-A-carbonate) [CASRN 111211-39-3]/Poly (acrylonitrile-butadiene-styrene) [CASRN 9003-56-9] blend with flame retardant | SABIC Innovative Plastics |
| CYCOLOY* XCY620-WH90527 | Poly (bisphenol-A-carbonate) [CASRN 111211-39-3]/Poly (acrylonitrile-butadiene-styrene) [CASRN 9003-56-9] blend with Titanium Dioxide | SABIC Innovative Plastics |
| CYCOLOY* C2950 | Poly (bisphenol-A-carbonate) [CASRN 111211-39-3]/Poly (acrylonitrile-butadiene-styrene) [CASRN 9003-56-9] blend with flame retardant | SABIC Innovative Plastics |
| CYCOLOY* XCM840 | Poly (bisphenol-A-carbonate) [CASRN 111211-39-3]/Poly (styreneacrylonitrile) [CASRN 9003-54-7] blend with Talc | SABIC Innovative Plastics |

Techniques and Procedures

The techniques and procedures used in Example 5 are discussed below.

Sample Preparation Process

The sample preparation methods are the same as those used in Example 2

Bisphenol A Polycarbonate Separation Process

The process steps and conditions in Example 5 were the same as those used in Example 4. The results for Example 5 are shown in FIG. 5.

Results

Figure 5:
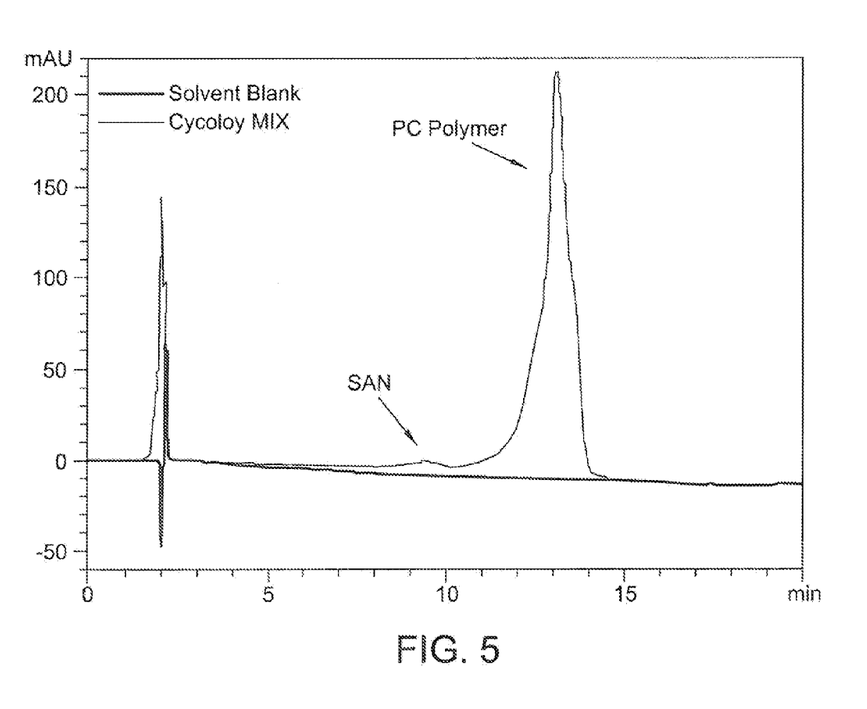
FIG. 5 is a graphic representation of the results of Example 5.

Liquid chromatography separation results for Example 5 are shown in FIG. 5

Discussion

The mixture used in Example 5 contains a large range of components including: bisphenol A polycarbonate, bulk ABS, emulsion ABS, styrene acrylonitrile polymer, flame retardants bisphenol A diphenyl phosphate and resorcinol diphenyl phosphate, an anti-drip agent, an impact modifier, an anti-oxidant, a mold release, a phosphate stabilizer, a heat stabilizer, talc, a quencher, a red dye, a blue pigment, and a yellow pigment. The separation process used in Example 5 is not effective in separating bisphenol A polycarbonate from the other components in the mixture as shown in FIG. 5. Because a distinct separation is not achieved using this separation process, separation of bisphenol A polycarbonate from similar mixtures by simulated moving bed chromatography would need different conditions to yield substantially pure bisphenol A polycarbonate.

Example 6

Purpose:

The purpose of this Example was to show how bisphenol A polycarbonate can be separated from a complex mixture of polycarbonate/Acrylonitrile butadiene styrene (ABS) blends. The separation of the bisphenol A polycarbonate could be performed using simulated moving bed chromatography. Ideally, the bisphenol A polycarbonate is separated in a pure form from the large amount of other components in the mixture.

Table 6 below shows the materials for this Example.
Materials

TABLE 6

| COMPONENT | CHEMICAL DESCRIPTION | SOURCE, VENDOR |
| --- | --- | --- |
| CYCOLOY* CY5100 | Poly (bisphenol-A-carbonate) [CASRN 111211-39-3]/Poly (acrylonitrile-butadiene-styrene) [CASRN 9003-56-9] blend with flame retardant | SABIC Innovative Plastics |
| CYCOLOY* XCY620-WH90527 | Poly (bisphenol-A-carbonate) [CASRN 111211-39-3]/Poly (acrylonitrile-butadiene-styrene) [CASRN 9003-56-9] blend with Titanium Dioxide | SABIC Innovative Plastics |
| CYCOLOY* C2950 | Poly (bisphenol-A-carbonate) [CASRN 111211-39-3]/Poly (acrylonitrile-butadiene-styrene) [CASRN 9003-56-9] blend with flame retardant | SABIC Innovative Plastics |
| CYCOLOY* XCM840 | Poly (bisphenol-A-carbonate) [CASRN 111211-39-3]/Poly (styreneacrylonitrite) [CASRN 9003-54-7] blend with Talc | SABIC Innovative Plastics |

*Trademark of SABIC Innovative Plastics IP B.V.

Techniques and Procedures

The techniques and procedures used in Example 6 are discussed below.

Sample Preparation Process

In Example 6, each of the polycarbonate/ABS blends (CY5100, XCY620-WH90527, C2950, and XCM840) are weighed in a container. Methylene chloride are added to the vial. After agitation, the solution is filtered using a 0.45 μm PTFE syringe filter to separate the components which are insoluble in methylene chloride such as the inorganic pigments and crosslinked ABS polymer.

Bisphenol A Polycarbonate Separation Process

An industrial-scale simulated moving bed (SMB) unit can be used for the effective separation of bisphenol A polycarbonate from a complex mixture of polycarbonate/ABS blends. The industrial scale unit includes a controller to adjust the switching time and a frame that supports a rotation gear, a drive assembly, and a column rack. Pumps are used to independently control the flow rates in the different zones. Columns are arranged into 3, 4, or 5 zone arrangements. The columns are packed with polymer-based particles, uncoated silica particles, coated silica particles, or other particles suitable for the separation. The particles are first slurried in methylene chloride and then transferred wet into the columns. The particles are then repeatedly washed using, methylene chloride. Switching times for Example 6 are set using the SMB controller. The feed and desorbant are continuously pumped into the columns at room temperature. Samples of separated streams (one stream containing polycarbonate in solution and another stream containing non-polycarbonate containing materials) are collected from the extract port and the raffinate port over an entire switching period. The flow rates and switching time are designed to give high purity bisphenol A polycarbonate with minimal losses of the bisphenol A polycarbonate in the raffinate Results Table 7 below shows the materials for this Example. The feed contains polycarbonate and non-polycarbonate materials. An extract stream and a raffinate stream form from the feed. Polycarbonate is extracted in the extract stream and soluble additives are removed in the raffinate stream. Before the extract stream and the raffinate stream form from the feed, materials that are insoluble in the solvent being used are filtered from the feed.

TABLE 7

| COMPONENT | FEED** | FILTERED** INSOLUBLE MATERIAL | EX-TRACT** STREAM | RAFFI-NATE STREAM** |
| --- | --- | --- | --- | --- |
| POLY-CARBONATE | 70% | 2% | 100% | 0% |
| ABS | 14% | 93% | 0% | 0% |
| SAN | 6% | 2% | 0% | 35% |
| ADDITIVES | 10% | 3% | 0% | 65% |

**Approximate

Discussion

Our results show that simulating moving bed chromatography can be used to effectively remove polycarbonate from feeds containing polycarbonate and other polymers at a commercial scale. More particularly, our results show that our invention is an effective method that separates at least one polycarbonate polymer cmp, position by liquid chromatography from a composition comprising a polycarbonate component and at least one member selected from the group of a mold release agent, a UV stabilizers, glasses, anti-drip agents, impact modifiers, anti-oxidants, FR synergists, heat stabilizers, quenchers, phosphate stabilizers, pigments dyes, titanium dioxides, carbon blacks, talcs, bulk acrylonitrile butadiene styrenes, acrylonitrile butadiene styrene emulsions, styrene acrylonitrile polymers, and combinations thereof.

More particularly, the mixture used in Example 6 contains a large range of components including: bisphenol A polycarbonate, bulk ABS, emulsion ABS, styrene acrylonitrile polymer, flame retardants bisphenol A diphenyl phosphate and resorcinol diphenyl phosphate, an anti-drip agent, an impact modifier, an anti-oxidant, a mold release, a phosphate stabilizer, a heat stabilizer, talc, a quencher, a red dye, a blue pigment, and a yellow pigment. The separation process used in Example 6 should be effective in separating bisphenol A polycarbonate from the other components in the mixture.

Example 7

Purpose:

The purpose of this Example was to show how bisphenol A polycarbonate can be separated from a complex mixture of polycarbonate blends. The separation of bisphenol A polycarbonate could be performed using simulated moving bed chromatography. Ideally, the bisphenol A polycarbonate is separated in a pure form from the large amount of other components in the mixture.

Materials

TABLE 8

| COMPONENT | CHEMICAL DESCRIPTION | SOURCE, VENDOR |
|---|---|---|
| LEXAN* 143R-7C013 | Poly (bisphenol-A-carbonate) [CASRN 111211-39-3] | SABIC INNOVATIVE PLASTICS |
| LEXAN* 3412R-BL3146 | Poly (bisphenol-A-carbonate) [CASRN 111211-39-3] with Fibrous glass and Titanium Dioxide | SABIC INNOVATIVE PLASTICS |
| LEXAN* ML5369-739 | Poly (bisphenol-A-carbonate) [CASRN 111211-39-3] with Fibrous glass and Carbon Black | SABIC INNOVATIVE PLASTICS |
| LEXAN* 503-3381 | Poly (bisphenol-A-carbonate) [CASRN 111211-39-3] with Fibrous Glass | SABIC INNOVATIVE PLASTICS |

*Trademark of SABIC Innovative Plastics IP B.V.

Techniques and Procedures

The techniques and procedures used in Example 7 are discussed below.

Sample Preparation Process

In Example 7, pellets of each of the polycarbonate blends (143R-7C013, 3412R-BL3146, ML5369-739, and 503-3381) are dissolved into tetrahydrofuran by stirring or agitation. The solution would then be filtered to separate the components which are insoluble in tetrahydrofuran such as the inorganic pigments.

Bisphenol A Polycarbonate Separation Process

The separation in Example 7 could be performed using simulated moving bed chromatography. The sample solution is continuously fed onto columns packed with polymer-based particles, uncoated silica particles, coated silica particles, or other particles suitable for the separation and a suitable solvent mixture such as cyclohexane:tetrahydrofuran. The suitable solvent mixture (a.k.a desorbent) is also continuously fed onto the columns with bisphenol A polycarbonate being separated from the other components of the mixture via interactions with the column packing. The columns are arranged in a specific manner and switching of the feeds is precisely controlled in order to transfer the bisphenol A polycarbonate to the extract solvent fraction and large majority of the other components to the raffinate.

Results

Table 9 below shows the materials for this Example. The feed contains: polycarbonate and non-polycarbonate materials. An extract stream and a raffinate stream form from the feed. Polycarbonate is extracted in the extract stream and soluble additives are removed in the raffinate stream. Before the extract stream and the raffinate stream form from the feed, materials that are insoluble in the solvent being used are filtered from the feed.

TABLE 9

| COMPONENT | FEED** | FILTERED INSOLUBLE MATERIAL** | EXTRACT STREAM** | RAFFINATE STREAM** |
|---|---|---|---|---|
| POLYCARBONATE | 95% | 2% | 100% | 0% |
| ABS | 0% | 0% | 0% | 0% |
| SAN | 0% | 0% | 0% | 0% |
| ADDITIVES | 5% | 98% | 0% | 100% |

**Approximate

Discussion

The mixture used in Example 7 contains a large range of components including: bisphenol A polycarbonate, brominated polycarbonate, a mold release, UV stabilizers glass, an anti-drip agent, an FR synergist, a heat stabilizer, a phosphate stabilizer, titanium dioxide, carbon black, a blue phtbalocyanine pigment, a blue dye, a green dye, and a brown pigment. The separation process used in Example 7 should be effective in separating bisphenol A polycarbonate from the other components.

Example 8

Purpose:

The purpose of this Example was to separate bisphenol A polycarbonate from a complex mixture of polycarbonate/Acrylonitrile butadiene styrene (ABS) blends. The separation of the bisphenol A polycarbonate is performed simulated moving bed chromatography. Ideally, the bisphenol A polycarbonate is separated in a pure form from the large amount of other components in the mixture.

Materials

TABLE 10

| COMPONENT | CHEMICAL DESCRIPTION | SOURCE, VENDOR |
|---|---|---|
| CYCOLOY* CY5100 | Poly (bisphenol-A-carbonate) [CASRN 111211-39-3]/Poly (acrylonitrile-butadiene-styrene) [CASRN 9003-56-9] blend with flame retardant | SABIC Innovative Plastics |
| CYCOLOY* XCY620-WH90527 | Poly (bisphenol-A-carbonate) [CASRN 111211-39-3]/Poly (acrylonitrile-butadiene-styrene) [CASRN 9003-56-9] blend with Titanium Dioxide | SABIC Innovative Plastics |
| CYCOLOY* C2950 | Poly (bisphenol-A-carbonate) [CASRN 111211-39-3]/Poly (acrylonitrile-butadiene-styrene) [CASRN 9003-56-9] blend with flame retardant | SABIC Innovative Plastics |
| CYCOLOY* XCM840 | Poly (bisphenol-A-carbonate) [CASRN 111211-39-3]/Poly (styreneacrylonitrile) [CASRN 9003-54-7] blend with Talc | SABIC Innovative Plastics |

*Trademark of SABIC Innovative Plastics IP B.V.

Techniques and Procedures

The techniques and procedures used in Example 8 are discussed below.

Sample Preparation Process

In Example 8, pellets of each of the polycarbonate/ABS blends (CY5100, XCY620-WH90527, C2950, and XCM840) are dissolved in tetrahydrofuran by stirring or agitation. The solution is then filtered to separate the components which are insoluble in tetrahydrofuran such as the inorganic pigments and crosslinked ABS polymer.

Bisphenol A Polycarbonate Separation Process

The process steps and conditions in Example 8 would be the same as those used in Example 7.

Results

Table 11 below shows the materials for this Example. The feed contains: polycarbonate and non-polycarbonate materials. An extract stream and a raffinate stream form from the feed. Polycarbonate is extracted in the extract stream and soluble additives are removed in the raffinate stream. Before the extract stream and the raffinate stream form from the feed, materials that are insoluble in the solvent being used are filtered from the feed.

TABLE 11

| COMPONENT | FEED** | FILTERED** INSOLUBLE MATERIAL | EX- TRACT** STREAM | RAFFI- NATE STREAM** |
|---|---|---|---|---|
| POLY- CARBONATE | 70% | 2% | 100% | 0% |
| ABS | 14% | 93% | 0% | 0% |
| SAN | 6% | 2% | 0% | 35% |
| ADDITIVES | 10% | 3% | 0% | 65% |

**Approximate

Discussion

The mixture used in Example 8 contains a large range of components including: bisphenol A polycarbonate, bulk ABS, emulsion ABS, styrene acrylonitrile polymer, flame retardants bisphenol A diphenyl phosphate and resorcinol diphenyl phosphate, an anti-drip agent, an impact modifier, an anti-oxidant, a mold release, a phosphate stabilizer, a heat stabilizer, talc, a quencher, a red dye, a blue pigment, and a yellow pigment. The separation process used in Example 8 is effective in separating bisphenol A polycarbonate from the other components in the mixture.

Example 9

Purpose:

The purpose of this Example was to separate bisphenol A polycarbonate from a mixture of bisphenol A polycarbonate and a brominated polycarbonate copolymer. The separation of the bisphenol A polycarbonate is performed using simulated moving bed chromatography. Ideally, the bisphenol A polycarbonate is separated in a pure form from the brominated polycarbonate copolymer.

Materials

TABLE 12

| COMPONENT | CHEMICAL DESCRIPTION | SOURCE, VENDOR |
|---|---|---|
| TBBPA/BPA COPOLYMER | TETRABROMOBISPHENOL A/BISPHENOL A POLYCARBONATE COPOLYMER | SABIC INNOVATIVE PLASTICS |
| 100 GRADE PC | BISPHENOL A POLYCARBONATE | SABIC INNOVATIVE PLASTICS |

Techniques and Procedures

The techniques and procedures used in Example 9 are discussed below.

Sample Preparation Process

In Example 9, pellets of each of the polymers (TBBPA/BPA copolymer and 100 grade PC) are dissolved in tetrahydrofuran by stirring or agitation. The solution would then be filtered to remove any trace concentration level, insoluble material.

Bisphenol A Polycarbonate Separation Process

The separation in Example 9 could be performed using simulated moving bed chromatography. The sample solution is continuously fed onto columns packed with polymer-based particles, uncoated silica particles, coated silica particles, or other particles suitable for the separation and a suitable solvent mixture such as acetonitrile:tetrahydrofuran. The suitable solvent mixture (a.k.a desorbent) is also continuously fed onto the columns with bisphenol A polycarbonate being separated from the brominated polycarbonate copolymer via interactions with the column packing. The columns are arranged in a specific manner and switching of the feeds is precisely controlled in order to transfer the brominated polycarbonate copolymer to the extract solvent fraction and large majority of bisphenol A polycarbonate to the raffinate.

Results

Table 13 below shows the materials for this Example. The feed contains: polycarbonate and non-polycarbonate materials. An extract stream and a raffinate stream form from the feed. Polycarbonate is extracted in the extract stream and soluble additives are removed in the raffinate stream. Before the extract stream and the raffinate stream form from the feed, materials that are insoluble in the solvent being used are filtered from the feed.

TABLE 13

| COMPONENT | FEED** | EXTRACT STREAM** | RAFFINATE STREAM** |
|---|---|---|---|
| POLYCARBONATE | 49.5% | 100% | 0% |
| BROMINATED POLYCARBONATE COPOLYMER | 49.5% | 0% | 98% |
| ADDITIVES | 1% | 0% | 2% |

**Approximate

Discussion

Our results show that the separation process used in Example 9 is effective in separating bisphenol A polycarbonate from the brominated polycarbonate copolymer. Separation of bisphenol A polycarbonate from mixtures with brominated polycarbonate copolymers by simulated moving bed chromatography would yield substantially pure bisphenol A polycarbonate.

Example 10

The procedure and materials of Example 6 were used, except that highly filled materials (containing approximately 40% inorganic filler) were used.

Results

Table 14 below shows the materials for this Example. The feed contains: polycarbonate and non-polycarbonate materials. An extract stream and a raffinate stream form from the feed. Polycarbonate is extracted in the extract stream and soluble additives are removed in the raffinate stream. Before the extract stream and the raffinate stream form from the feed, materials that are insoluble in the solvent being used are filtered from the feed.

TABLE 14

| COMPONENT | FEED** | FILTERED** INSOLUBLE MATERIAL | EX- TRACT** STREAM | RAFFI- NATE STREAM** |
|---|---|---|---|---|
| POLY- CARBONATE | 40% | 2% | 100% | 0% |
| ABS | 10% | 19% | 0% | 0% |
| SAN | 6% | 2% | 0% | 67% |
| ADDITIVES | 44% | 77% | 0% | 33% |

**Approximate

Discussion

The mixture used in Example 10 contains a large range of components including: bisphenol A polycarbonate, bulk ABS, emulsion ABS, styrene acrylonitrile polymer, flame retardants bisphenol A diphenyl phosphate and resorcinol diphenyl phosphate, an anti-drip agent, an impact modifier, an anti-oxidant, a mold release, a phosphate stabilizer, a heat stabilizer, talc, a quencher, a red dye, a blue pigment, a yellow pigment and a large amount of glass. The separation process used in Example 10 is effective in separating bisphenol A polycarbonate from the other components in the mixture. Although glass is used in this Example, other inorganic fillers can be used in its place.

Example 11

The procedure and materials of Example 6 were used, except that reduced amounts of ABS and additives were used.
Results Table 15 below shows the materials for this Example. The feed contains: polycarbonate and non-polycarbonate materials. An extract stream and a raffinate stream form from the feed. Polycarbonate is extracted in the extract stream and soluble additives are removed in the raffinate stream. Before the extract stream and the raffinate stream form from the feed, materials that are insoluble in the solvent being used are filtered from the feed.

TABLE 15

| COMPONENT | FEED** | FILTERED** INSOLUBLE MATERIAL | EX-TRACT** STREAM | RAFFI-NATE STREAM** |
|---|---|---|---|---|
| POLY-CARBONATE | 83% | 2% | 100% | 0% |
| ABS | 10% | 96% | 0% | 0% |
| SAN | 6% | 2% | 0% | 86% |
| ADDITIVES | 1% | 0% | 0% | 14% |

**Approximate

Discussion

The mixture used in Example 11 contains a large range of components including: bisphenol A polycarbonate, bulk ABS, emulsion ABS, styrene acrylonitrile polymer, flame retardants bisphenol A diphenyl phosphate and resorcinol diphenyl phosphate, an anti-drip agent, an impact modifier, an anti-oxidant, a mold release, a phosphate stabilizer, a heat stabilizer, talc, a quencher, a red dye, a blue pigment, a yellow pigment. The separation process used in Example 11 is effective in separating bisphenol A polycarbonate from the other components in the mixture.

As used throughout the specification and claims all parts or percentages (%) are by weight unless otherwise noted.

We claim:

1. A method comprising separating at least one polycarbonate polymer by liquid chromatography from a feed composition comprising a polycarbonate component selected from the group of polycarbonate homopolymers and polycarbonate copolymers and at least one member selected from the group of
   a mold release agent,
   a UV stabilizer,
   a glass,
   an anti-drip agent,
   an impact modifier,
   an anti-oxidant,
   an FR synergist,
   a heat stabilizer,
   a quencher,
   a phosphate stabilizer,
   a pigment,
   a dye,
   titanium dioxide,
   carbon black,
   talc,
   a bulk acrylonitrile butadiene styrene,
   an acrylonitrile butadiene styrene emulsion,
   a styrene acrylonitrile polymer,
   and combinations thereof.

2. The method of claim 1, wherein the liquid chromatography is simulated moving bed chromatography, wherein the feed composition forms a raffinate stream substantially containing non-polycarbonate materials and an extract stream substantially containing the polycarbonate.

3. The method of claim 1, wherein the liquid chromatography is gradient polymer elution chromatography.

4. The method of claim 1, wherein a packing selected from the group consisting of polymer-based particles, uncoated inorganic particles and ligand modified particles of polymer or inorganic particles is employed to separate the at least one polycarbonate polymer by liquid chromatography.

5. The method of claim 1, wherein at least one polycarbonate comprises a brominated polycarbonate copolymer.

6. The method of claim 1, wherein at least one polycarbonate polymer is bisphenol A polycarbonate.

7. The method of claim 6, wherein substantially pure bisphenol A polycarbonate is obtained.

8. The method of claim 1, further comprising filtering insoluble materials from the composition.

9. The method of claim 1, further comprising dissolving at least one polymer component of the composition in a solvent prior to separating the at least one polycarbonate polymer by liquid chromatography.

10. The method of claim 9, wherein the solvent is selected from the group of alkylene halides, tetrhydrofurans, N-methylpyrrolidone, phenols, dimethyl acetamide.

11. The method of claim 10, wherein the solvent is methylene chloride.

12. The method of claim 4, wherein the inorganic particle is silica.

13. The method of claim 4, wherein the polymer is styrene-DVB.

14. The method of claim 1, further comprising performing the chromatography in a stationary bed column.

15. The method of claim 1, further comprising performing the chromatography in a simulated moving-bed.

* * * * *